C. W & W. W. Marsh.
Harvester Dropper.
Nº 46373
Patented Feb. 14, 1865.
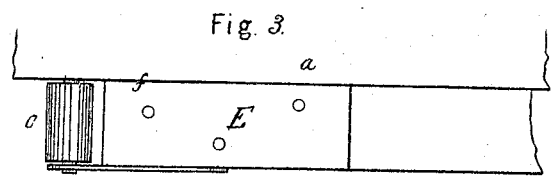
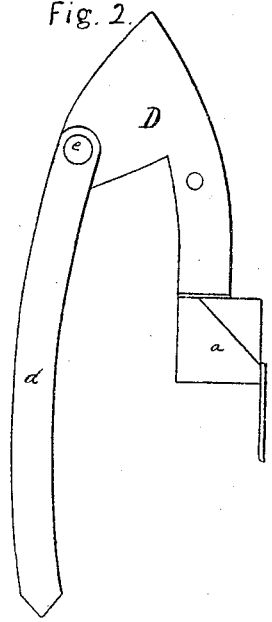
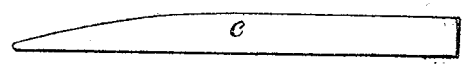
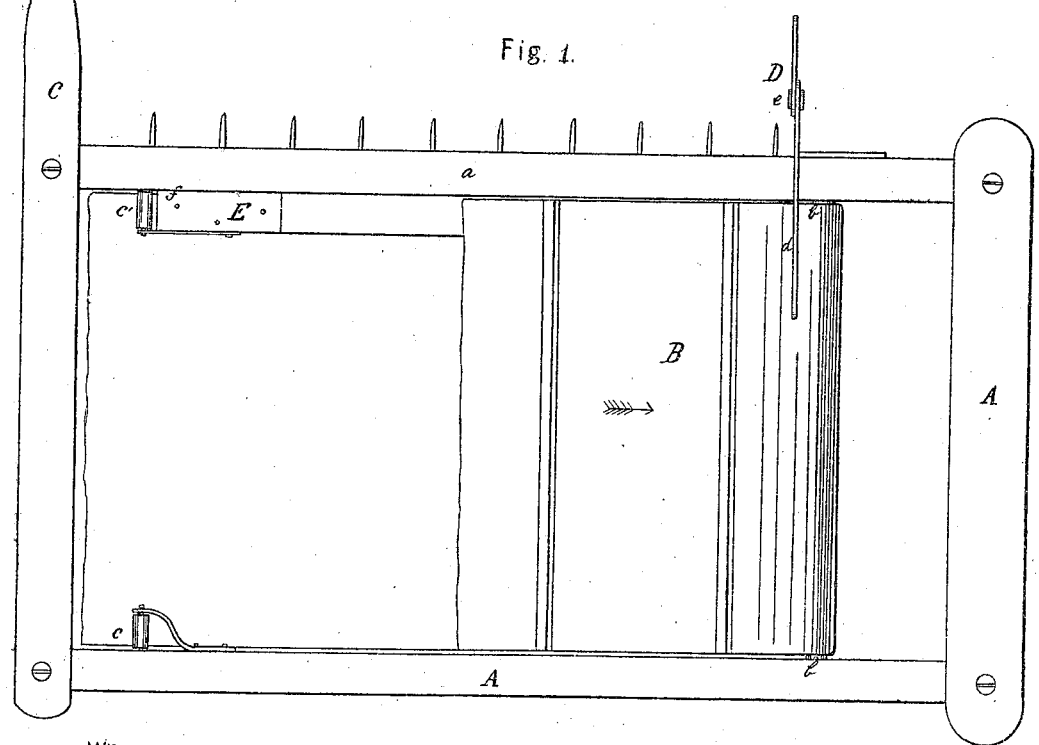
Witnesses
Albert Hinds
Samuel Marsh
Inventor
Chas W Marsh
William W Marsh

UNITED STATES PATENT OFFICE.

CHAS. W. MARSH AND WM. W. MARSH, OF CLINTON, ILLINOIS.

IMPROVEMENT IN HARVESTERS.

Specification forming part of Letters Patent No. 46,373, dated February 14, 1865.

*To all whom it may concern:*

Be it known that we, CHARLES W. MARSH and WILLIAM W. MARSH, of Clinton, in the county of DeKalb, in the State of Illinois, have invented a new and useful Improvement in a Self-Raking Device for Harvesters; and we do declare that the following is a full, clear, and exact description of the construction and operation of the same, reference being had to the annexed drawings, making a part of this specification, in which—

Figure 1 is a top view of the platform-frame of a harvester having therein an endless band, and attached the several parts of our invention in combination therewith. Figs. 2, 3, and 4 are details of the same.

Similar letters of reference indicate corresponding parts in the figures.

To enable those skilled in the art to fully understand and construct our invention, we will proceed to describe it.

A represents the platform-frame of a harvester, and B a revolving band or platform placed therein over the roller $b$ and friction-rollers $c'$ $c$. This revolving band B extends the whole width inside the frame A and moves in the direction indicated by the arrow 1.

C represents the grain-divider, which may be of the ordinary construction.

D represents a gatherer, which may be attached to the sickle-beam $a$ of the frame A in any efficient manner. This gatherer D is scalloped or hollowed forward from the sickle-beam $a$ toward its point sufficiently to enable the butts of the cut grain moving with the band B in the direction of the arrow 1 to pass freely through. It is also provided with an extension, $d$, which reaches back and over the beam $a$ and band B, said extension $d$ being attached to the main part of the gatherer D at the joint $e$.

E is a scraper attached to the beam $a$ in such a manner as to present an edge to the roller $c'$. This scraper E has this edge, which is presented to the roller $c'$ as aforesaid, depressed at its outer and forward side, as shown at $f$.

The platform-frame A, with the parts above described, being attached to the main frame of a harvester, said main frame containing the drive-wheel and the gearing required to vibrate the sickle and to revolve the rake, constitutes a harvester with our improvements applied thereto.

The operation is as follows: As the machine is drawn along, the grain, being cut by a reciprocating sickle in the usual way, falls backward upon the revolving band B. If the machine is cutting its full capacity, the width of the "swath" being cut will be equal to the distance from the point of the divider C to the point of the gatherer D. Practical operators with a reaping-machine or harvester know that the grain as it is being cut (except at either end of the sickle) falls backward upon the platform with the same inclination as it may have had when standing before being cut. The straws supporting each other, they fall in "harmony"; but this does not hold good at either end of the sickle, where the tendency is for the straws to fall outward because unsupported on that side. On ordinary machines the divider obviates this tendency on its side and the gatherer on the other, and the cut grain, being raked backward, renders the attachment of a sufficient gatherer a matter of no difficulty; but where the cut grain is removed from the platform by a direct side-acting rake, as shown by band B in Fig. 1, the butts of the straw would be retained by the gatherer, unless it were scalloped or hollowed, as shown by Fig. 2. Again, where the standing grain leans toward the gatherer side of the machine, the point of the gatherer raises the straws, which, as the machine moves forward, are gradually raised toward a perpendicular until they are cut off by the sickle, when the revolving band B (the straws being pushed back by the reel) catch their butts and run them along until they are parallel with the extension $d$ of the gatherer D, when they drop off from the gatherer or its extension and fall upon the canvas or revolving band B, comparatively squarely across it. As the straw is sometimes long, it is necessary that the gatherer should be extended backward and upward for some distance; and to remedy the opposite difficulty—that is, when the straw is very short and might fall under—the extension $d$ is provided with a joint, as shown at $e$, enabling the operator to set this extension to suit the length of the grain to be cut. The band B is revolved by the roller $b$, operated by any efficient means from the drive-wheel, and by its revolution turns the friction-rollers $c$ toward the scraper E. Fine leaves from the straw and other matter work under the band B, gradually wind around the roller $c'$, and render the motion of the band B uneven and unsteady, or may stop it altogether; but the scraper E is placed with its edge toward the roller $c'$, and as the band B gives the roller $c'$ a quick motion the matter which collects on the roller $c^2$, and which might impede the band B, is turned off by the scraper E, the edge of which being depressed in the manner shown, the matter thus turned or scraped off is thrown and drawn outside of the band B.

Thus it will be seen that the grain next the gatherer D will be supported, raised, and straightened, so that it may fall upon the band B in much better shape than without the use of said scalloped gatherer D, and the extension $d$ gives the necessary adaptability to all lengths of grain, and the scraper E, with its depressed edge applied to the rollers $c$, removes the windings from the roller $c$, directing the matter thus turned off outside the band B, rendering its motion more even and its use more practical.

Having thus described our invention, we claim as new, and desire to secure by Letters Patent—

1. The scalloped gatherer D, provided with the hinged extension $d$, as described, when used in connection with the band B, substantially as and for the purpose specified.

2. The scraper E for the roller $c'$, when constructed as described and used with the endless band B, for the purpose specified.

In testimony whereof we, the said CHARLES W. MARSH and WILLIAM W. MARSH, hereto subscribe our names, in the presence of the witnesses whose names are hereto subscribed, on the 3d day of November, 1864.

CHARLES W. MARSH.
WILLIAM W. MARSH.

Witnesses:
ALBERT HINDS,
SAMUEL MARSH.